(12) United States Patent
Van Druten et al.

(10) Patent No.: US 8,555,844 B2
(45) Date of Patent: Oct. 15, 2013

(54) START SYSTEM FOR A COMBUSTION ENGINE OF A VEHICLE

(75) Inventors: Roell Marie Van Druten, Eindhoven (NL); Bas Gerard Vroemen, Eindhoven (NL); Alexander Franciscus Anita Serrarens, Wallre (NL)

(73) Assignee: DTI Group, B.V., Eindhoven (NL)

( * ) Notice: Subject to any disclaimer, the term of this patent is extended or adjusted under 35 U.S.C. 154(b) by 0 days.

(21) Appl. No.: 13/262,777

(22) PCT Filed: Apr. 7, 2010

(86) PCT No.: PCT/NL2010/000062
§ 371 (c)(1),
(2), (4) Date: Nov. 22, 2011

(87) PCT Pub. No.: WO2010/114365
PCT Pub. Date: Oct. 7, 2010

(65) Prior Publication Data
US 2012/0090569 A1     Apr. 19, 2012

(30) Foreign Application Priority Data

Apr. 3, 2009  (NL) .................................... 2002715
Nov. 13, 2009 (NL) .................................... 2003801
Nov. 19, 2009 (NL) .................................... 2003827

(51) Int. Cl.
*F02N 5/04*       (2006.01)
*F02N 15/10*      (2006.01)

(52) U.S. Cl.
USPC ............. 123/179.22; 123/179.25; 180/65.285

(58) Field of Classification Search
USPC ......... 123/179.25, 179.22; 180/65.22, 65.285
See application file for complete search history.

(56) References Cited

U.S. PATENT DOCUMENTS

| | | | | |
|---|---|---|---|---|
| 5,558,173 | A * | 9/1996 | Sherman | 180/53.8 |
| 6,022,290 | A * | 2/2000 | Lyon | 477/108 |
| 6,817,327 | B2 * | 11/2004 | Ehrlinger et al. | 123/179.22 |
| 7,061,130 | B1 * | 6/2006 | Blackburn et al. | 290/31 |
| 7,108,095 | B1 * | 9/2006 | Washington et al. | 180/165 |
| 7,610,891 | B2 * | 11/2009 | Seufert et al. | 123/179.25 |
| 8,037,858 | B2 * | 10/2011 | Seufert et al. | 123/179.25 |
| 8,166,945 | B2 * | 5/2012 | Spicer et al. | 123/179.28 |
| 2006/0011394 | A1 * | 1/2006 | Colvin et al. | 180/65.2 |
| 2009/0255741 | A1 * | 10/2009 | Major et al. | 180/65.22 |
| 2010/0252342 | A1 * | 10/2010 | Jordan | 180/65.22 |

FOREIGN PATENT DOCUMENTS

GB    2047816       12/1980
JP    57159956 A *  10/1982

* cited by examiner

Primary Examiner — Erick Solis
(74) Attorney, Agent, or Firm — Eric Karich

(57) ABSTRACT

A drive mechanism 1 comprises a combustion engine 3 and a start system 5 which has an output 7 that is connected to a camshaft 9 of the combustion engine. The start system further includes a flywheel 11 and connecting means connecting the flywheel to the output. The connecting means comprise a clutch 13 and a gear reduction 15.
The start system 5 further includes a drive source 17 formed by an electromotor which is directly connected to the flywheel 11 or which is connected to the connecting means between the clutch 13 and the flywheel 11. The maximum power that can be delivered by the drive source 17 is just sufficient to maintain the flywheel at the proper r.p.m. If the drive source 17 is turned on, it thus delivers just sufficient power to maintain the flywheel at the proper r.p.m. The maximum power of the drive source is in this case 50 W.

15 Claims, 2 Drawing Sheets

START SYSTEM FOR A COMBUSTION ENGINE OF A VEHICLE

FIELD OF THE INVENTION

The invention relates to a start system for a combustion engine of a vehicle, comprising an output which can be coupled to the camshaft of the combustion engine, a flywheel, connecting means connecting the flywheel to the output and comprising a clutch, and comprising a drive source coupled to the connecting means or to the flywheel.

STATE OF THE ART

A start system of this type is known from JP-A-57159956. In this known start system the drive source is arranged as an electrical starting motor which is permanently connected to the output. The clutch is then positioned between the starting motor and the flywheel.

SUMMARY OF THE INVENTION

It is an object of the invention to provide a start system of the type defined in the opening paragraph, which is more cost-effective than the known system. For this purpose, the start system according to the invention is characterised in that the drive source is connected to the flywheel or, between the clutch and the flywheel, is connected to the connecting means while the drive source, if turned on, delivers sufficient power to have the flywheel maintain its speed. Since the drive source only needs to have the flywheel maintain its speed and need not be capable of accelerating the flywheel, the drive source may have a light structure and hence be cost-effective.

The maximum power that can be delivered by the drive source preferably needs to be just sufficient to have the flywheel maintain its speed. To this end the power of the drive source is preferably 500 W at the most, and more preferably 50 W.

An embodiment of the start system according to the invention is characterised in that the connecting means furthermore comprise a gear reduction which is positioned between the output and the clutch.

A further embodiment of the start system according to the invention is characterised in that the connecting means comprise a further gear reduction which is positioned between the flywheel and the clutch.

A still further embodiment of the start system according to the invention is characterised in that a freewheel clutch or freewheel bearing is positioned parallel to the clutch and the gear reduction or further gear reduction.

The clutch and the gear reduction or the further gear reduction are preferably formed by a brake and a planetary gear set comprising at least three rotational members, of which a first rotational member is connected to the output, a second rotational member is connected to the flywheel and a third rotational member is connected to the brake.

Furthermore, the brake is preferably formed by the drive source which is arranged as an electromotor, or the brake is formed by an electromotor and/or generator. This electromotor and/or generator may be an electromotor or a starter-alternator (starter motor alternator) or an alternator. In this case the flywheel is preferably formed by the rotor of the electromotor and/or generator or the flywheel is connected thereto.

A further embodiment of the start system according to the invention is characterised in that a further freewheel clutch or a further freewheel bearing is positioned between the flywheel or the brake and the output.

A still further embodiment of the start system according to the invention is characterised in that a further brake is coupled to the electromotor and/or generator or to the flywheel.

Preferably, the brake or clutch is open in a non-actuated state and is kept open by means of a spring or centrifugal element.

Furthermore, preferably a further clutch is positioned between the clutch and the output. This further clutch is preferably arranged as a centrifugal decoupling, which decouples beyond a certain speed. This centrifugal decoupling is preferably directly coupled with one side to the camshaft.

Yet a further embodiment of the start system according to the invention is characterised in that the centrifugal decoupling is combined with the clutch that can be actively actuated.

The invention also relates to a drive mechanism for a vehicle comprising a combustion engine, as well as a start system of which the output is connected to the camshaft of the combustion engine.

An embodiment of the start system according to the invention is characterised in that the combustion engine comprises a multi-belt, as well as a pulley conveying the multi-belt and connected to the end of the camshaft, the output of the start system being connected to said end of the camshaft.

An embodiment of the start system according to the invention is characterised in that the output of the start system is connected to a further belt wheel which is connected to the camshaft via the multi-belt. These two belt wheels together with the distributor belt then preferably form the further gear reduction.

A further embodiment of the start system according to the invention is characterised in that the output of the start system is connected via an additional pulley transmission to the end of the camshaft of the combustion engine.

BRIEF DESCRIPTION OF THE DRAWINGS

The invention will now be described in more detail based on examples of embodiment of the drive mechanism with the start system according to the invention represented in the drawings. Herein

DETAILED DESCRIPTION OF THE DRAWINGS

Figures 1, 2:
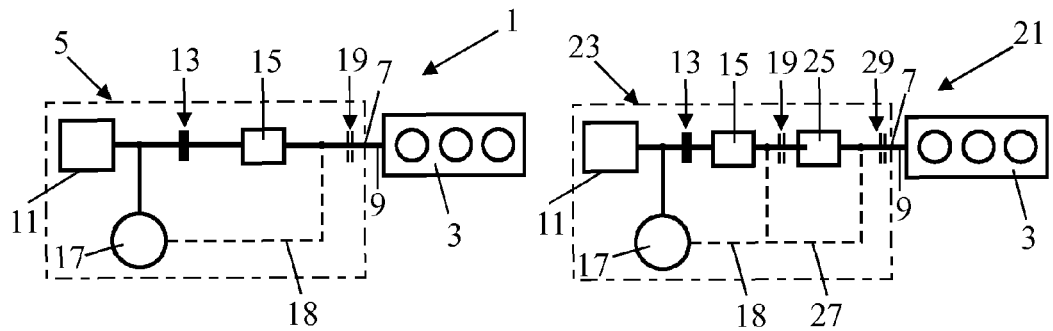
FIGS. 1 to 12 show twelve embodiments of the drive mechanism with the start system according to the invention.

FIGS. 1 to 6 show various embodiments of the drive mechanism with the start system according to the invention. The components that are the same in the embodiments are designated by like reference numerals.

FIG. 1 gives a diagrammatic representation of a first embodiment of the drive mechanism according to the invention. The drive mechanism 1 comprises a combustion engine 3 and a start system 5 which has an output 7 that is connected to a camshaft 9 of the combustion engine. The start system further comprises a flywheel 11 as well as connecting means which connect the flywheel to the output. The connecting means comprise a clutch 13 and a gear reduction 15.

The start system 5 further includes a drive source 17 formed by an electromotor which is directly connected to the flywheel 11 or between the clutch 13 and the flywheel 11 is connected to the connecting means. The maximum power that can be delivered by the drive source 17 is just sufficient to maintain the flywheel at the desired speed. If the drive source 17 is turned on, it delivers just sufficient power to maintain the flywheel at the desired speed. The maximum power of the drive source is then 50 W.

The drive source 17 may also be connected to the connecting means between the gear reduction 15 and the output 7. This is designated by the broken line 18. In addition, a further clutch 19 may also be positioned between this connecting point and the output.

FIG. 2 gives a diagrammatic representation of a second embodiment of the drive mechanism according to the invention. In this drive mechanism 21 the connecting means of the start system 23 have a further gear reduction 25 which is positioned between the gear reduction 15 and the output 7. The drive source 17 may then also be connected to the connecting means between the further gear reduction and the output. This is designated by broken line 27. Furthermore, a further clutch 29 may be positioned between this connecting point and the output.

Figures 3, 4:
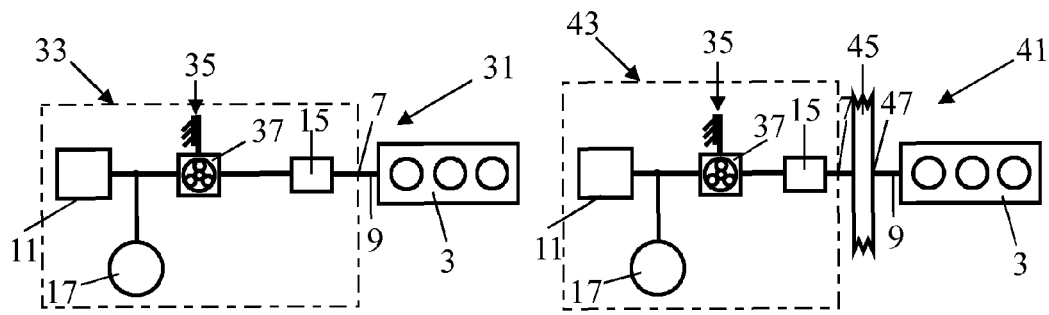
Figures 5, 6:
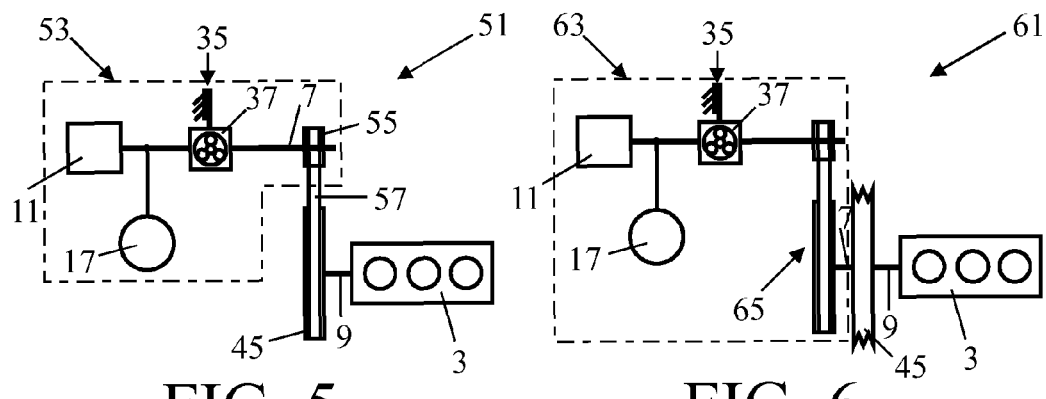

FIG. 3 gives a diagrammatic representation of a third embodiment of the drive mechanism according to the invention. In this drive mechanism 31 the gear reduction and the clutch of the start system 33 are formed by a brake 35 and a planetary gear set 37 which comprises at least three rotational members, of which a first rotational member is connected to the output 7, a second rotational member is connected to the flywheel 11 and a third rotational member is connected to the brake 35.

FIG. 4 gives a diagrammatic representation of a fourth embodiment of the drive mechanism according to the invention. The combustion engine 3 comprises a pulley 45 which conveys a distributor drivebelt. The pulley 45 is connected to an end 47 of the camshaft 9. In this drive mechanism 41 the output 7 of the start system 43 is connected to the end 47 of the camshaft. In the fifth embodiment of the drive mechanism 51 according to the invention and represented in FIG. 5 the output 7 of the start system 53 is connected to a further pulley 55 which is connected to the pulley 45 via the distributor drivebelt 57 of the combustion engine 3. In the sixth embodiment of the drive mechanism 61 according to the invention and represented in FIG. 6 the output 7 of the start system 63 is connected to the end 47 of the camshaft 9 of the combustion engine 3 via an additional belt transmission 65.

Figure 7:
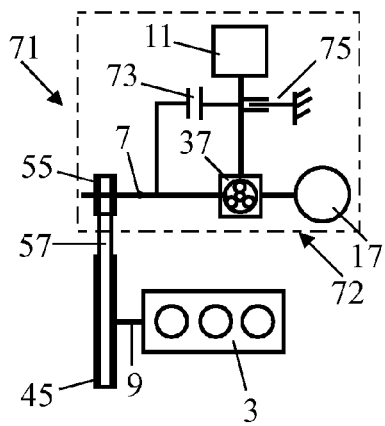
Figure 8:
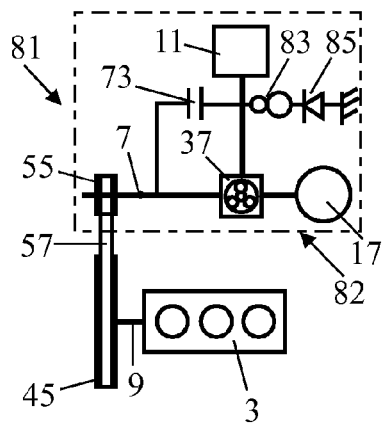

FIGS. 7 and 8 show a seventh and an eighth embodiment of the drive mechanism 71, 81 provided with a start system 72, 82 according to the invention. Herein the drive source is formed by an electromotor/generator 17 (starter alternator) which is connected to the annulus of the planetary gear set 37. The carrier of the planetary gear set is connected to the camshaft 9 of the combustion engine 3 via the belt transmission 57. The flywheel 11 is connected to the sun gear of the planetary gear set 37. A clutch 73 is positioned between the flywheel 11 and the output 7. In the start system 72 shown in FIG. 7 the flywheel 11 is connected to a brake 75, whereas in the start system 82 shown in FIG. 8 the flywheel 11 is connected to a freewheel bearing 85 via a gear reduction 83.

The combustion engine 3 may be started by the electromotor/generator 17 while the brake 75 is closed/locked. The electromotor/generator 17 is then power driven. Via the planetary gear set 37 torque can be supported by the brake 75 or the freewheel bearing 85. An advantage of this planetary torque gain is the lower start current needed for starting the combustion engine 3.

Starting the combustion engine 3 may also be effected by means of the electromotor/generator 17 where first the flywheel 11 is brought to speed by the electromotor/generator, while torque is supported by the camshaft 9 but which camshaft does not start rotating (limited torque). Subsequently, the clutch 73 may be closed as a result of which the flywheel 11 can directly transfer torque to the camshaft 9. In an assisting role it is also possible for the electromotor/generator 17 to help out (as a generator or as a motor) while the clutch is being closed or after it has been closed. It is furthermore possible for the electromotor/generator 17 to be of assistance with open clutch 73 where torque is supported by the flywheel 11 and/or the brake 75 or the freewheel bearing 85. An advantage of this starting mode is here again the lower start current (or even the absence of it).

The combustion engine 3 can also be started in another way by the electromotor/generator 17, that is, the way in which the flywheel 11 is already rotating, so that additional torque gain is obtained via the planetary gear set 37. The electromotor/generator 17 is then first used as a generator and if possible as a motor after that. So doing, the torque is supported by the flywheel 11 via the planetary gear set 37. An advantage of the planetary gear torque gain is again the lower start current.

Energy can be stored in the flywheel 11 by driving the electromotor/generator 17 as a generator. An advantageous choice of the gear ratios provides that the flywheel can be charged via the planetary gear set with 2 to 5 times as much power. The energy that is stored in the flywheel then originates from the camshaft 9. Torque is then supported by the flywheel 11 via the planetary gear set 37. This preferably takes place during a braking action of the driver and/or when he lets go of the accelerator pedal (recovery of braking energy). An advantage of the planetary gear set and the flywheel is the power gain as a result of which energy can be recovered with more power than with a battery, which battery is limited as regards the high-power storage of energy.

The combustion engine 3 may be assisted by driving the electromotor/generator 17 as a motor. Thanks to an advantageous choice of the gear ratios, it is possible here too to discharge the flywheel with 2 to 5 times as much power via the planetary gear set. Here too torque is supported by the flywheel 11 via the planetary gear set 37. This preferably takes place during acceleration of the vehicle (motor assist). An advantage of the planetary gear set and the flywheel is the power gain as a result of which the vehicle can be assisted with higher power levels.

Once the combustion engine 3 has been turned off, the flywheel 11 can be discharged by driving the electromotor/generator 17 as a generator (with low power so that the combustion engine is not started), while the battery is being charged. Torque is again supported by the flywheel 11 via the planetary gear set 37. This preferably takes place after the combustion engine has been turned off. An advantage is that the stored brake energy (of the flywheel) can gradually be stored in the battery. Besides, it is more advantageous to store the prevailing energy in the flywheel in the battery and use it for the restart, than to keep the flywheel at the proper speed and subsequently restart the combustion engine with the clutch 73.

The clutch 73 also has for its function to sustainedly generate and avoid the flywheel gaining excessive speed at high speeds of the combustion engine (>2000 rpm) combined with low speeds (>0 rpm) of the electromotor/generator.

If the clutch 73 is closed, the flywheel 11 revolves along with the electromotor/generator 17 and the combustion engine 3. The electromotor/generator can then be driven both as a generator and as a motor. The clutch 73 is preferably closed while the vehicle is driven at high speed with a high number of revolutions per minute (r.p.m.) (>2000 rpm). When accelerating at high speed of the engine the electromotor/generator will be used as a motor so as to allow the flywheel not to be revved up fast, so that the flywheel need not be revved up extra by the combustion engine. The speed of the flywheel is consequently limited too, but this can only happen temporarily.

Figure 9:
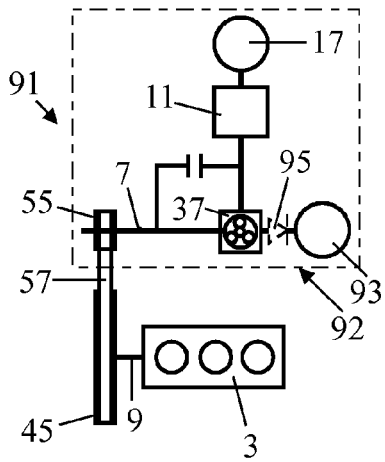

In the ninth embodiment of the drive mechanism 91 with start system 92 shown in FIG. 9 an alternator 93 is coupled to the planetary gear set 37. With a closed clutch 73 the start system operates as an existing alternator.

When the brakes on the vehicle are applied, the clutch 73 can be opened as a result of which the flywheel 11 gains speed by keeping generating with the alternator. The r.p.m. of the flywheel then goes from about 3,000 to the order of 10,000 r.p.m. at about 1,000 r.p.m. of the combustion engine. When the combustion engine is turned off, the annulus (to which the alternator is connected) of the planetary gear set 37 will revolve negatively. By means of a freewheel bearing 95 the alternator need not be revved up too in negative direction (the latter thus remains stationary). For maintaining the flywheel 11 at the proper speed, a minor electromotor (not shown) is coupled to the flywheel which can now be energized. If a restart is desired, the clutch 73 is closed, so that the flywheel revs up the combustion engine by means of the friction clutch. An advantage is that the electrical start system need not be adjusted and the accumulator is not loaded more frequently.

This start system 92 can also be coupled to the camshaft 9 on the other side (side of the engine flywheel) of the combustion engine 3.

Figure 10:
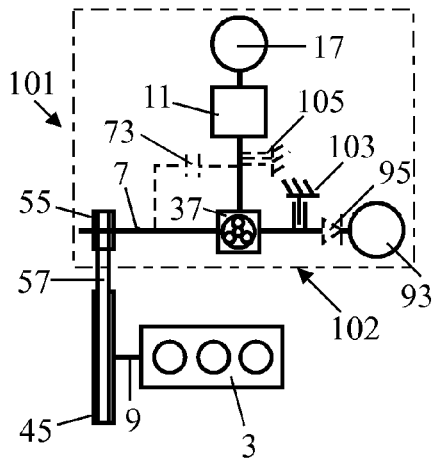

In the drive mechanism 101 with start system 102 shown in FIG. 10 a friction brake 103 is used for starting the combustion engine 3. The advantage of this is that the reduction at which impulse start is taking place is about 1:10, so that less energy is lost in the brake than with an impulse start with clutch 73.

For sustainedly generating with the alternator 93, the clutch 73 or a brake 105 is to be added and be actuated as described above. The charging of the flywheel 11 can be effected both by the friction brake 103 and by the alternator 93.

Figure 11:
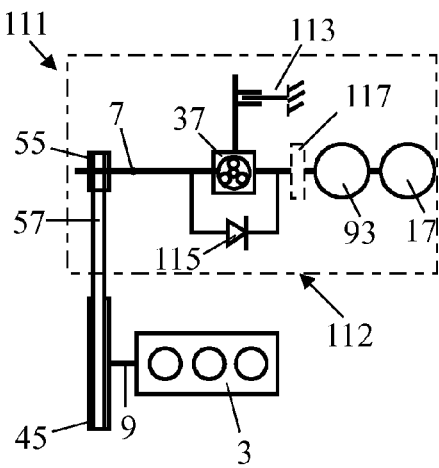
Figure 12:
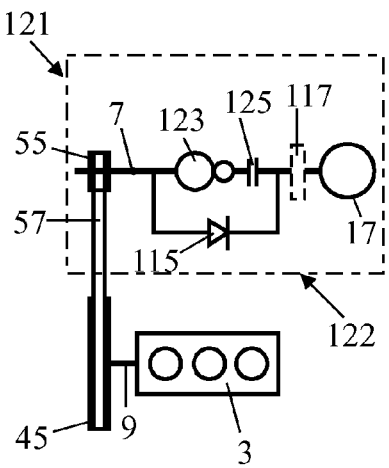

FIGS. 11 and 12 show an eleventh and a twelfth embodiment of the drive mechanism 111 and 121 with start system 112 and 122. In the start system 112 shown in FIG. 11 a brake 113 is connected to the annulus of the planetary gear set 37. In parallel with the planetary gear set 37 a freewheel bearing 115 is connected to the planet carrier and the sun gear of the planetary gear set. In the start system 122 shown in FIG. 12 the freewheel bearing 115 is connected parallel to a gear reduction 123 and a clutch 125. The alternator and electromotor/generator is then replaced with a starter alternator 127. Optionally, a flywheel 117 can be incorporated in these start systems.

In the generator mode the alternator 93 or starter alternator 127 can apply a braking torque to the camshaft 9 via the freewheel bearing 115. The gear reduction is not used then (1:1).

By actuating the friction clutch 125 or the friction brake 113 the alternator 93 or the starter alternator 127 can be revved up when the combustion engine has between 1000 and 2000 r.p.m. This does not require electric power. By increasing the inertia of the alternator, kinetic energy is stored. This preferably takes place when the brake is applied or the accelerator pedal is released. In this way brake energy can be recovered. The stored kinetic energy can be used for recharging the battery by enabling the alternator to generate. To this end the clutch 125 or the brake 113 is to be re-opened.

The stored kinetic energy can also be used for an impulse start. When the combustion engine is turned off, the brake 113 or the clutch 125 is opened and the flywheel 117 and/or the inertia of the alternator 93 or starter alternator 127 is maintained at the proper r.p.m.

If a restart is desired, the brake 113 or the clutch 125 can be closed as a result of which the combustion engine 3 is started without loading the electrical system.

Albeit the invention has been described in the foregoing with reference to the drawings, it should be observed that the invention is not by any manner or means restricted to the embodiments shown in the drawings. The invention also extends to all embodiments deviating from the embodiments shown in the drawings within the spirit and scope defined by the claims. For example, a further clutch may be positioned between the clutch and the output. This further clutch is in that case preferably arranged as a centrifugal decoupling, which decouples beyond a certain r.p.m. This centrifugal decoupling is then preferably directly coupled with one side to the camshaft.

What is claimed is:

1. A start system for a combustion engine of a vehicle the combustion engine having a drive shaft, the start system comprising:
an output adapted to be operably engaged with the drive shaft of the combustion engine;
a clutch;
connector connecting the clutch to the output, a flywheel unit comprising:
a further output connected to the clutch;
a flywheel; and
a further connector connecting the flywheel to the further output;
a drive source connected to the flywheel unit which drive source, if turned on, delivers sufficient power to have the flywheel maintain its speed; and
wherein the connector comprises:
a gear reduction; and
a further clutch between the gear reduction and the output and arranged as a centrifugal decoupling which decouples beyond a certain speed, or as a freewheel clutch, or a freewheel bearing.

2. The start system of claim 1, wherein the connector further comprises a further gear reduction.

3. The start system of claim 1, further comprising a further freewheel clutch or further freewheel bearing positioned parallel to the clutch and the gear reduction.

4. The start system of claim 3, characterised in that a freewheel clutch or freewheel bearing is positioned parallel to the clutch and the further gear reduction.

5. The start system as claimed in claim 1, wherein the clutch and the gear reduction or the further gear reduction are preferably formed by a brake and a planetary gear set comprising at least three rotational members, of which a first rotational member is connected to the output, a second rotational member is connected to the flywheel, and a third rotational member is connected to the brake.

6. The start system of claim 5, wherein the brake is formed by the drive source which is arranged as an electromotor.

7. The start system of claim 5, wherein the brake is formed by an electromotor and/or a generator.

8. The start system of claim 7, wherein the flywheel is formed by a rotor of the electromotor and/or the generator, or wherein the flywheel is connected thereto.

9. The start system of claim 7, further comprising a further brake coupled to the electromotor and/or the generator or to the flywheel.

10. The start system of claim 1, wherein the brake or clutch is open in a non-actuated state and is kept open by means of a spring or centrifugal element.

11. The start system of claim 1, wherein the centrifugal decoupling is combined with the clutch that can be actively actuated.

12. A drive mechanism for a vehicle comprising:
a combustion engine having a crankshaft;
a start system comprising:
   an output connected to the crankshaft of the combustion engine;
   a clutch;
   connecting means connecting the clutch to the output;
   a flywheel unit comprising:
      a further output connected to the clutch;
      a flywheel; and
      further connecting means connecting the flywheel to the further output,
   a drive source connected to the flywheel unit which drive source, if turned on,
   delivers sufficient power to have the flywheel maintain its speed;
wherein the connecting means comprises:
   a gear reduction; and
   a further clutch between the gear reduction and the output and arranged as a centrifugal decoupling which decouples beyond a certain speed, or as a freewheel clutch, or a freewheel bearing.

13. The drive mechanism as claimed in claim 12, characterised in that the combustion engine comprises a multi-V belt, as well as a pulley conveying the multi-V belt and connected to an end of the crankshaft, the output of the start system being connected to said end of the crankshaft.

14. The drive mechanism as claimed in claim 13, characterised in that the output of the start system is connected to a further pulley which is connected to the crankshaft via the multi-V belt.

15. The drive mechanism as claimed in claim 13, characterised in that the output of the start system is connected to the end of the crankshaft of the combustion engine via an additional pulley transmission.

* * * * *